United States Patent [19]

Geberth, Jr.

[11] Patent Number: 4,500,119
[45] Date of Patent: Feb. 19, 1985

[54] FLUID SWIVEL COUPLING

[76] Inventor: John D. Geberth, Jr., 10 Goose Cove Lane, Ramsey, N.J. 07446

[21] Appl. No.: 477,131

[22] Filed: Mar. 21, 1983

[51] Int. Cl.³ .............................................. F16L 27/00
[52] U.S. Cl. .................................... 285/276; 285/281; 285/351
[58] Field of Search .................. 285/276, 281, 351, 16

[56] References Cited

U.S. PATENT DOCUMENTS

| | | | |
|---|---|---|---|
| 2,176,323 | 10/1939 | Bowen et al. .................... | 285/281 X |
| 2,396,123 | 3/1946 | Phillips ............................ | 285/276 X |
| 3,420,555 | 1/1969 | Faccou ............................. | 285/276 |

Primary Examiner—Richard J. Scanlan, Jr.
Attorney, Agent, or Firm—Collard, Roe & Galgano

[57] ABSTRACT

A fluid swivel coupling is provided for interconnecting two fluid conduits so that they may swivel or rotate about their common axis. The coupling includes a swivel body connected to one fluid conduit and adapted to accept for rotational movement therein a spindle which is connected to a second fluid conduit and which is provided with an axial fluid bore which communicates between the two fluid conduits. The swivel coupling further includes a packing seal for preventing leakage between the swivel body and spindle. That part of the coupling moving with respect to the packing seal is formed of a very hard, wear resistant material in order to prevent leaking as a result of wear.

1 Claim, 3 Drawing Figures

FLUID SWIVEL COUPLING

The present invention relates generally to a fluid swivel coupling used for the purpose of interconnecting two fluid conduits on a common axis where rotational movement of the conduits about the interconnecting axis is desired and, more particularly, it relates to a significantly improved swivel coupling for such use in interconnecting fluid conduits where the fluid passing through the coupling contains suspended solid particles therein.

In the case of a swivel coupling connecting two fluid conduits the coupling is generally comprised of a swivel body or housing and a spindle, each being secured to an end of a fluid conduit. The swivel housing is provided with an axial bore therethrough which is adapted to accept the spindle of the swivel coupling. A fluid bore extends through the spindle thus providing a fluid connection or communication between the two fluid conduits. The swivel housing and the spindle are connected in such a manner that axis movement therebetween is prevented while rotational movement is freely permitted. Since the swivel housing and the spindle move relative to each other, a suitable seal therebetween must be provided in order to prevent leakage. Thus, a packing seal, usually comprising a series of washers formed of a resilient material, is positioned on the spindle and compressed thereabout and against the swivel housing to form an effective seal therebetween. Such swivel couplings find great utility in the hydraulic paint spraying field where a fluid conduit is connected via a swivel coupling to a hand held paint spray gun so that the operator of the spray gun is afforded maximum versatility in the painting operation.

During use of such a swivel coupling the swivel housing rotates on spindle and the packing seal remains stationary with respect to the one or the other depending on the design of the swivel coupling. In the case of hydraulic paint spraying where the liquid being sprayed has suspended therein or contains solid particles, such as where the liquid is a pigmented paint, some small amount of the liquid will invariably find its way between the packing seal and the moving part of the swivel coupling. The result of this liquid infiltration is that solid particles contained in the infiltrating liquid will imbed themselves in the relatively soft material of the packing seal and act as an abrasive on the moving or rotating part of the swivel. The result of this abrasive action on the swivel coupling is to cause a wearing away of the part moving with respect to the packing seal and thus an eventual destruction of the swivel coupling seal.

It is, therefore, a primary object of the present invention to provide a fluid swivel coupling, adapted to be used in coupling fluid conduits where rotational movement of the conduits is required about the interconnecting axis and wherein the fluid passing therethrough contains or has suspended therein solid particles, which has a greater wear resistance at the seal than such swivels heretofore in use.

The above object, as well as others which will hereinafter become apparent, is accomplished in accordance with the present invention by providing together with the spindle of a fluid swivel coupling used in interconnecting fluid conduits of a stem portion formed of a very hard, wear resistant material, the stem portion being that part of the spindle of the swivel in moving contact with the packing seal for the swivel coupling.

The present invention will be described and understood more readily when considered together with the accompanying drawings, in which.

Figure 1:
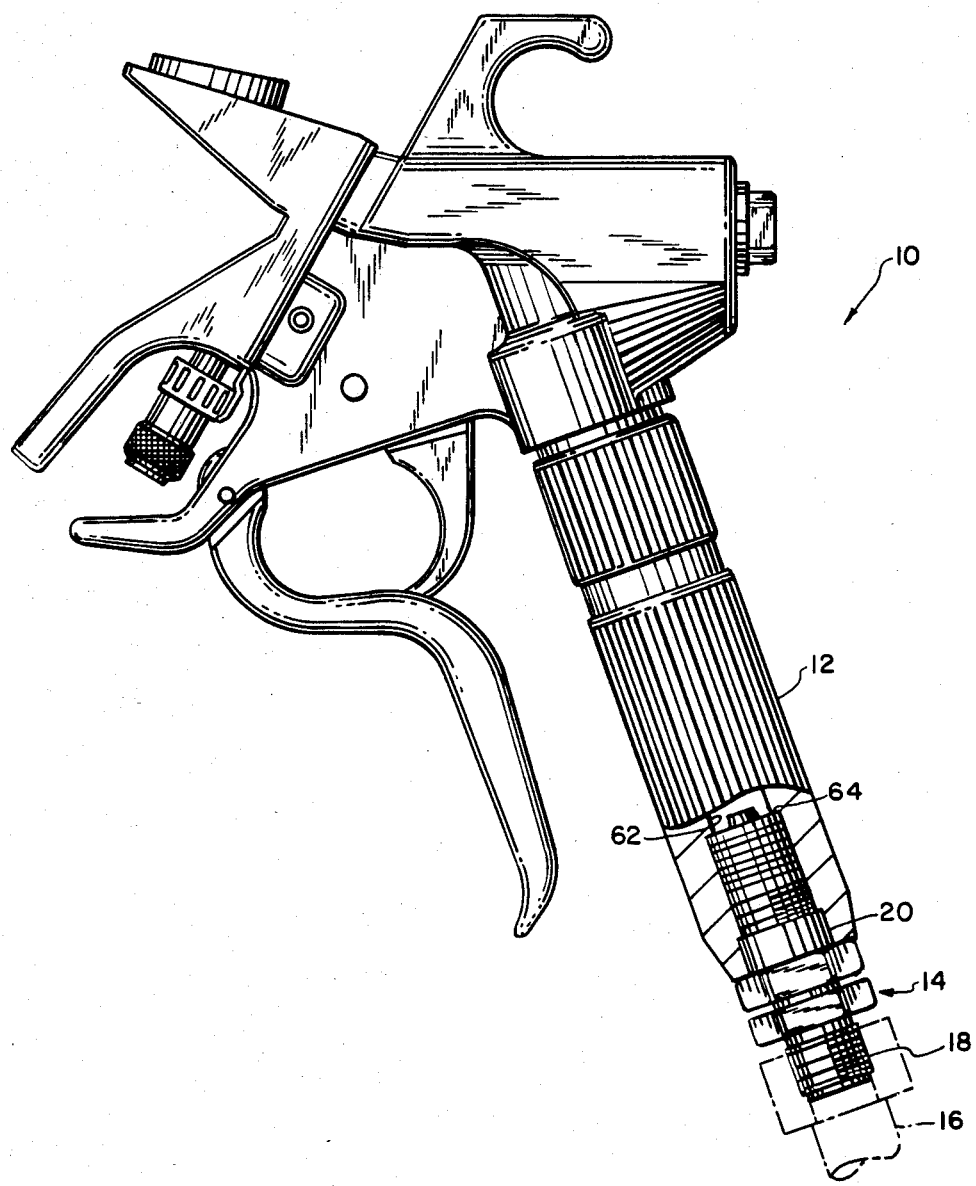
FIG. 1 is a side elevational view of a paint spray gun, partly broken away, showing the fluid swivel coupling of the present invention.

Now referring to the drawings, there is shown in FIG. 1 a hand held hydraulic paint spray gun, generally designated 10, having a handle portion, designated 12, to which a fluid swivel coupling according to the present invention, generally designated 14, is connected. A fluid conduit such as a hose, shown in phantom and designated 16, is connected to the end of swivel coupling 14 opposite the connection to handle portion 12 and serves to deliver liquid paint to spray gun 10.

Figure 2:
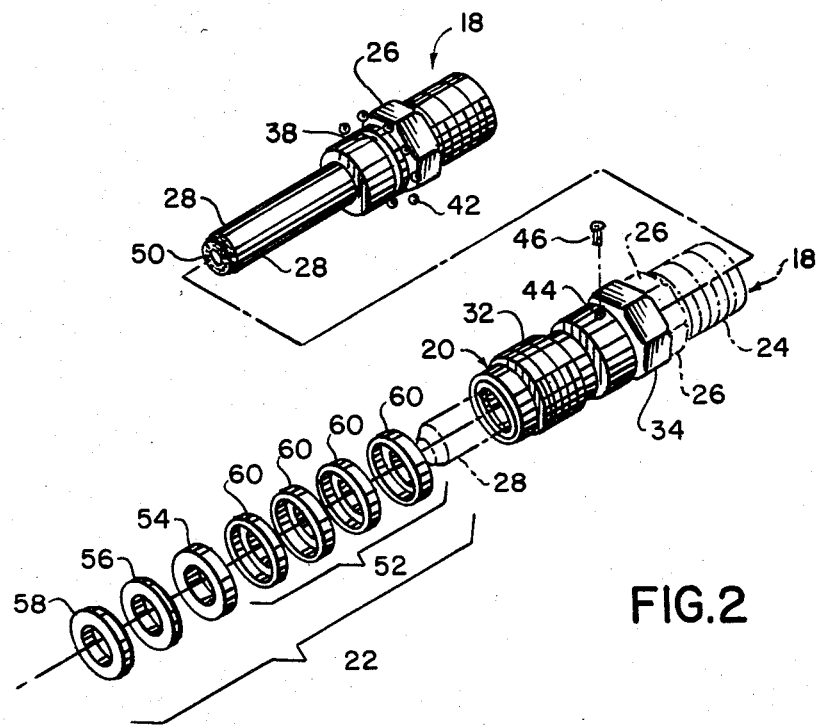
FIG. 2 is an exploded perspective view of the fluid swivel coupling of the present invention.
Figure 3:
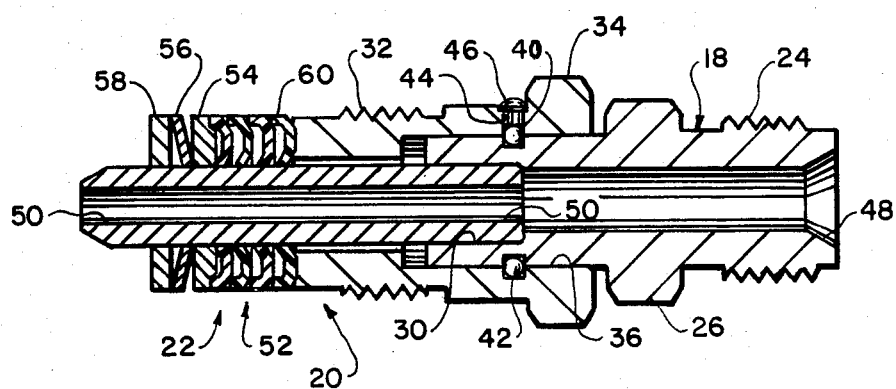
FIG. 3 is an enlarged cross sectional view of the fluid swivel coupling of the present invention.

As clearly seen in FIGS. 2 and 3, fluid swivel coupling 14 is basically comprised of three elements, a spindle assembly, designated 18, a swivel body or housing, designated 20, and a fluid seal assembly, designated 22. Spindle assembly 18 is provided with screw threads, designated 24, for the purpose of threadably engaging spindle assembly 18 with fluid conduit 16 (see FIG. 1) which is also provided with complementary screw threads. Wrench flats, designated 26, are provided on spindle assembly 18 to facilitate connection to fluid conduit 16. The end of spindle assembly 18 opposite its connection to fluid conduit 16 is provided with a stem portion, designated 28, which may be press fitted into a bore 30 in spindle assembly 18.

Swivel body 20 is provided with screw threads 32 for the purpose of threadably engaging swivel body 20 with another fluid conduit or to a spray gun handle 12, as clearly seen in FIG. 1. Again, wrench flats 34 are provided on swivel body 20 in order to facilitate connection to spray gun handle 12 or another suitable fluid conduit. Swivel body 20 has an axial bore, designated 36, therethrough which is adapted to accept for rotational movement therein spindle assembly 18. In order to engage spindle assembly 18 with swivel body 20 to provide for rotational or swivel movement between them, an annular exterior groove, designated 38, is provided in spindle assembly 18 coincident with annular interior groove 40 in bore 36 of swivel body 20. A series of ball bearings, designated 42, is housed in the race created by mating the grooves 38 and 40 thereby preventing axial movement between the two swivel members but permitting rotational movement therebetween. The ball bearings 42 may be positioned in the race by insertion through opeining 44 in swivel body 20. When all of the ball bearings 42 have been positioned, a plug, designated 46, is inserted into opening 44 thereby sealing it. An axial fluid bore, designated 48, extends through the length of spindle assembly 18 and is axially aligned with fluid bore 50 in stem 28 thereby providing an uninterrupted fluid connection between fluid conduit 16 and spray gun 10.

Fluid seal assembly 22 comprises a packing seal, designated 52, a seal compressor, designated 54, a bevelled spring washer, designated 56, and a flat washer, designated 58. Packing 52 may be comprised of a series of sealing washers, designated 60, formed of a resilient material, which are fitted onto stem portion 28 of spindle assembly 18 and butt up against the end of swivel body 20. With fluid seal assembly 22 onto stem 28, the stem end of swivel coupling 14 is inserted into bore 62 of handle 12 of spray gun 10 and threadably engaged with handle portion 12 by means of screw threads 32 and wrench flats 34. When thus assembled, washer 58 of seal assembly 22 butts against shoulder 64 in bore 62 of handle portion 12. As swivel body 20 is tightened into handle 12, bevelled spring washer 56 is placed under great tension as it is compressed thus exerting increasing force on seal compressor 54 which in turn increasingly compresses packing seal 52. As the compressive forces on packing seal 52 are increased, the sealing washers 60 extend radially, both inwardly and outwardly, exerting increasingly greater sealing pressure on the wall of bore 62 and the stem portion 28 of spindle assembly 18. Thus, the tightness of seal assembly 22 may be adjusted as desired by the operator of the spray gun.

Because of the compressive forces exerted on packing seal 52 by spring washer 56 and seal compressor 54, packing seal 52 remains stationary with respect to swivel body 20 as spindle assembly 18 and stem portion 28 rotate within swivel body 20. As pointed out above, some of the fluid material passing through the fluid coupling 14 infiltrates between packing seal 52 and stem portion 28, with the result that some of the solid particles carried by the infiltrating fluid material become imbedded in the packing resulting in an abrasive surface. Thus, by forming stem portion 28 of a very hard, wear resistant material, such as tungsten carbide or a ceramic material, wear of stem portions 28 by the abrasive action of particles imbedded in packing 52 and consequent leaking is effectively prevented.

It is to be understood that the foregoing general and detailed descriptions are explanatory of the present invention and are not to be interpreted as restrictive of the scope of the following claims.

What is claimed is:

1. A fluid swivel coupling for interconnecting a first fluid conduit and a second fluid conduit, said second fluid conduit having an internal shoulder therein, for rotational movement about their common axis where the fluid flowing therein contains suspended solid particles, said fluid swivel coupling comprising:
  (a) a spindle having an axial fluid bore therethrough including means for securing a first end of said spindle to said first fluid conduit;
  (b) a stem portion of hard, wear resistant material at the second end of said spindle having an axial fluid bore therethrough axially aligned with the fluid bore of said spindle;
  (c) a swivel body having an axial bore therethrough for accepting said spindle coaxially therein including means for threadably engaging said swivel body axially to said second fluid conduit so that an end of said swivel body extends into said conduit;
  (d) means for connecting said spindle within the axial bore of said swivel body so that said swivel body rotates on said spindle about their common axis; and
  (e) a packing seal for effecting a fluid tight seal between said spindle and said swivel body disposed surrounding the stem portion of said spindle and between the internal shoulder of said second fluid conduit and said end of said swivel body extending into said conduit, so that said packing seal is compressed about said stem portion and between the shoulder of said second fluid conduit and said end of said swivel body to thereby effect a fluid tight seal between said spindle and said swivel body which is adjustable by adjustment of the threadable engagement between said swivel body and said second fluid conduit.

* * * * *